(12) United States Patent
Morita et al.

(10) Patent No.: US 12,405,585 B2
(45) Date of Patent: Sep. 2, 2025

(54) AIR CONDITIONING SYSTEM INCLUDING A PLATFORM WITH REMOTE ACCESS TO A MAIN BODY OF AN AIR CONDITIONING APPARATUS AND INCLUDING MULTIPLE FUNCTION LAYERS

(71) Applicant: FUJITSU GENERAL LIMITED, Kanagawa (JP)

(72) Inventors: Sumie Morita, Kanagawa (JP); Takeshi Umemoto, Kanagawa (JP); Tamotsu Nakajima, Kanagawa (JP); Masanori Tomita, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 472 days.

(21) Appl. No.: 17/915,269

(22) PCT Filed: Mar. 30, 2021

(86) PCT No.: PCT/JP2021/013729
§ 371 (c)(1),
(2) Date: Sep. 28, 2022

(87) PCT Pub. No.: WO2021/201058
PCT Pub. Date: Oct. 7, 2021

(65) Prior Publication Data
US 2023/0135375 A1    May 4, 2023

(30) Foreign Application Priority Data
Mar. 31, 2020 (JP) ................. 2020-065234

(51) Int. Cl.
*F24F 11/63* (2018.01)
*G05B 19/042* (2006.01)

(52) U.S. Cl.
CPC ............ *G05B 19/042* (2013.01); *F24F 11/63* (2018.01); *G05B 2219/2614* (2013.01)

(58) Field of Classification Search
CPC ........... G05B 19/042; G05B 2219/2614; F24F 11/63; F24F 11/56; F24F 11/58; F24F 11/30; F24F 11/89; G08C 17/02
See application file for complete search history.

(56) References Cited

U.S. PATENT DOCUMENTS

2002/0174206 A1    11/2002   Moyer et al.
2006/0026972 A1*    2/2006   Masui ................. F24F 11/62
                                                        236/51

(Continued)

FOREIGN PATENT DOCUMENTS

CN        101978222        2/2011
CN        103780739        5/2014

(Continued)

OTHER PUBLICATIONS

"Cloud Service Platform Cosminexus, Hitachi Innovation Forum", Oct. 30, 2014 (received date), pp. 1-18.

(Continued)

*Primary Examiner* — Alicia M. Choi
(74) *Attorney, Agent, or Firm* — Greenblum and Bernstein, P.L.C.

(57) ABSTRACT

An air conditioning system includes a main body device and a remote device. The main body device includes a hardware group and first software that controls the hardware group. The remote device includes an arithmetic processing unit and second software that controls the arithmetic processing unit. The first software includes a hardware access layer, a control layer, and a main body device-side function layer that accepts an order to the main body device and outputs a first instruction to the control layer. The second software includes a remote device-side function layer that accepts an (Continued)

order to the main body device and outputs a second instruction to the control layer via the main body device-side function layer. A function execution program that executes a function of the main body device is in at least one of the main body device-side function layer or the remote device-side function layer.

8 Claims, 7 Drawing Sheets

(56) References Cited

U.S. PATENT DOCUMENTS

| | | |
|---|---|---|
| 2010/0325270 A1 | 12/2010 | Ishizaka |
| 2014/0040435 A1 | 2/2014 | Ylimartimo |
| 2014/0058567 A1* | 2/2014 | Matsuoka ............... G05B 15/02 700/276 |
| 2018/0180300 A1* | 6/2018 | Gabriel ............... G05D 23/1905 |
| 2019/0041080 A1 | 2/2019 | Higuchi et al. |
| 2019/0101304 A1* | 4/2019 | Yoon ........................ F24F 11/62 |
| 2019/0203968 A1* | 7/2019 | Lee ........................... F24F 1/20 |
| 2019/0209022 A1* | 7/2019 | Sobol .................... A61B 5/1118 |

FOREIGN PATENT DOCUMENTS

| | | |
|---|---|---|
| CN | 103968508 | 8/2014 |
| CN | 108700323 | 10/2018 |
| EP | 2264374 | 12/2010 |
| JP | 2004-289505 A | 10/2004 |
| JP | 2004-532481 A | 10/2004 |
| JP | 2009-133549 | 6/2009 |
| JP | 2017-207254 A | 11/2017 |

OTHER PUBLICATIONS

International Search Report (including English Language Translation), mailed Jul. 6, 2021, by the Japan Patent Office (JPO), in International Application No. PCT/JP2021/013729.

Extended European Search Report (EESR) from European Patent Office (EPO) in European Patent Appl. No. 21779752.1, dated Mar. 13, 2024.

Office Action issued by the China National Intellectual Property Administration (CNIPA) in Chinese Patent Application No. 202180024615.6, dated Sep. 12, 2024, together with an English language translation.

* cited by examiner

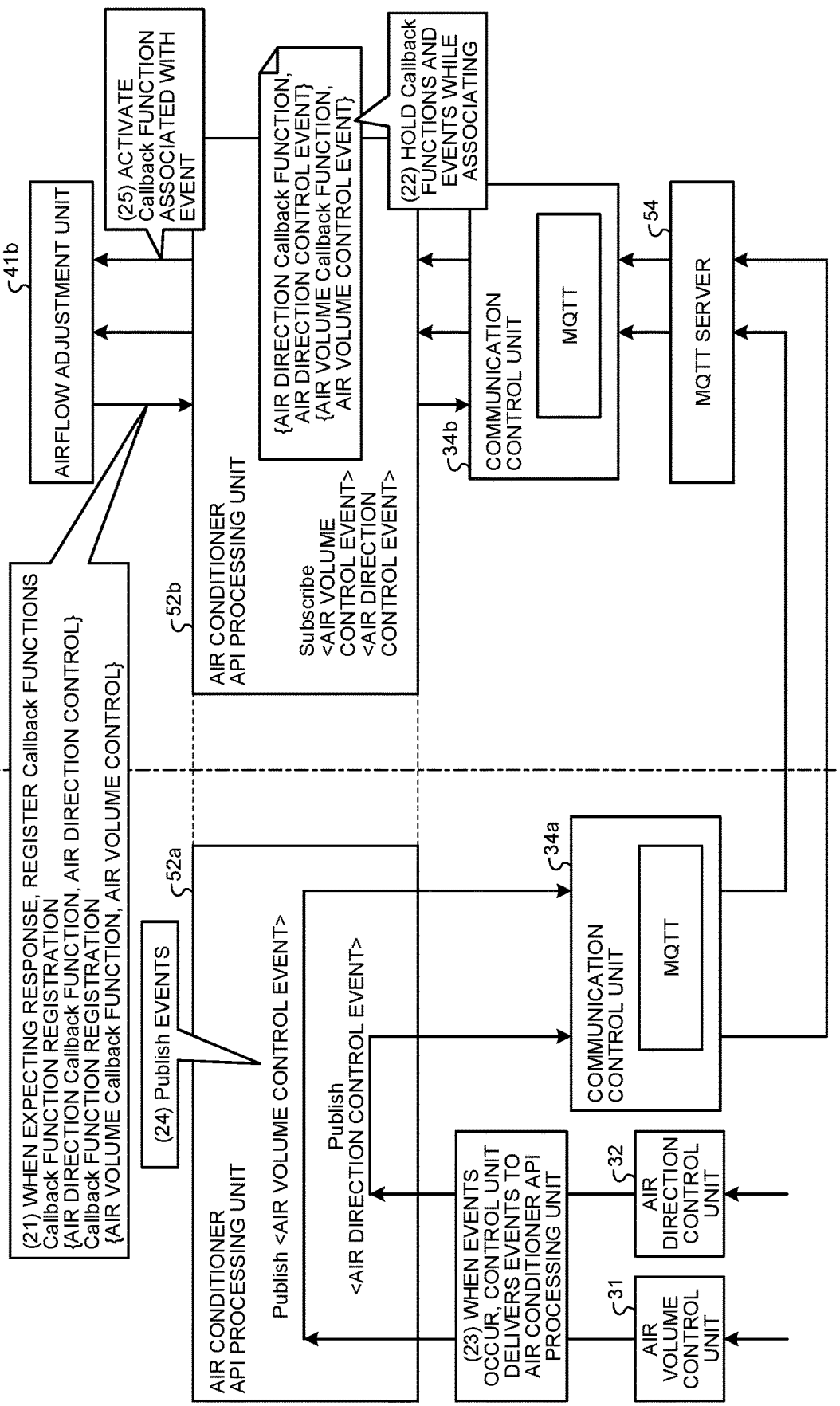

AIR CONDITIONING SYSTEM INCLUDING A PLATFORM WITH REMOTE ACCESS TO A MAIN BODY OF AN AIR CONDITIONING APPARATUS AND INCLUDING MULTIPLE FUNCTION LAYERS

FIELD

The present invention relates to an air conditioning system.

BACKGROUND

These days, air conditioning apparatuses provide users with various functions such as a function of performing remote control from a portable terminal such as a smartphone via a network. These functions are implemented by software.

CITATION LIST

Patent Literature

Patent Literature 1: JP 2004-289505 A

SUMMARY

Technical Problem

In a conventional air conditioning apparatus, its hardware (a compressor, a heat exchanger, a blower fan, etc.) and software that executes various functions are integrated in the main body of the air conditioning apparatus. Therefore, control on the main body of the air conditioning apparatus and collection of working information, etc. from the main body of the air conditioning apparatus basically need access to the main body of the air conditioning apparatus; hence, there has been a problem that the flexibility is limited and it is less easy to provide services such as maintenance service and function addition.

The present invention solves the above problem, and an object of the present invention is to provide an air conditioning system including a platform with which access (control, information collection, etc.) to the main body of the air conditioning apparatus can be performed from various locations (the air conditioning apparatus, a cloud, etc.). Here, the platform is a function layer provided in each location.

Solution to Problem

According to an aspect of an embodiment, the air conditioning system includes a main body device and a remote device. The main body device includes a hardware group that includes at least a compressor, a heat exchanger, and a blower fan, and software that controls the hardware group. The remote device includes at least an arithmetic processing unit and software that controls the arithmetic processing unit, and the remote device is connected to the main body device via a network. The software of the main body device includes a hardware access layer including a driver group that drives each piece of hardware, a control layer that controls the hardware group via the driver group, and a main body device-side function layer that accepts an order to the main body device and outputs an instruction to the control layer. The software of the remote device includes a remote device-side function layer that accepts an order to the main body device and outputs an instruction to the control layer via the main body device-side function layer. Further, a function execution program that executes a function provided by the main body device is placed in at least one of the main body device-side function layer and the remote device-side function layer.

Advantageous Effects of Invention

In the disclosed air conditioning system, access to the main body of the air conditioning apparatus can be performed from various locations.

DESCRIPTION OF DRAWINGS

FIG. 7 is a diagram illustrating a case where an airflow adjustment unit is placed in a cloud and the airflow adjustment unit receives, from an air conditioner API processing unit, event-type responses to an air volume change instruction and an air direction change instruction.

DESCRIPTION OF EMBODIMENTS

Hereinbelow, embodiments of an air conditioning system disclosed by the present application are described in detail on the basis of the drawings. Note that the air conditioning system disclosed by the present application is not limited by the following embodiments.

Embodiments

Figure 1:
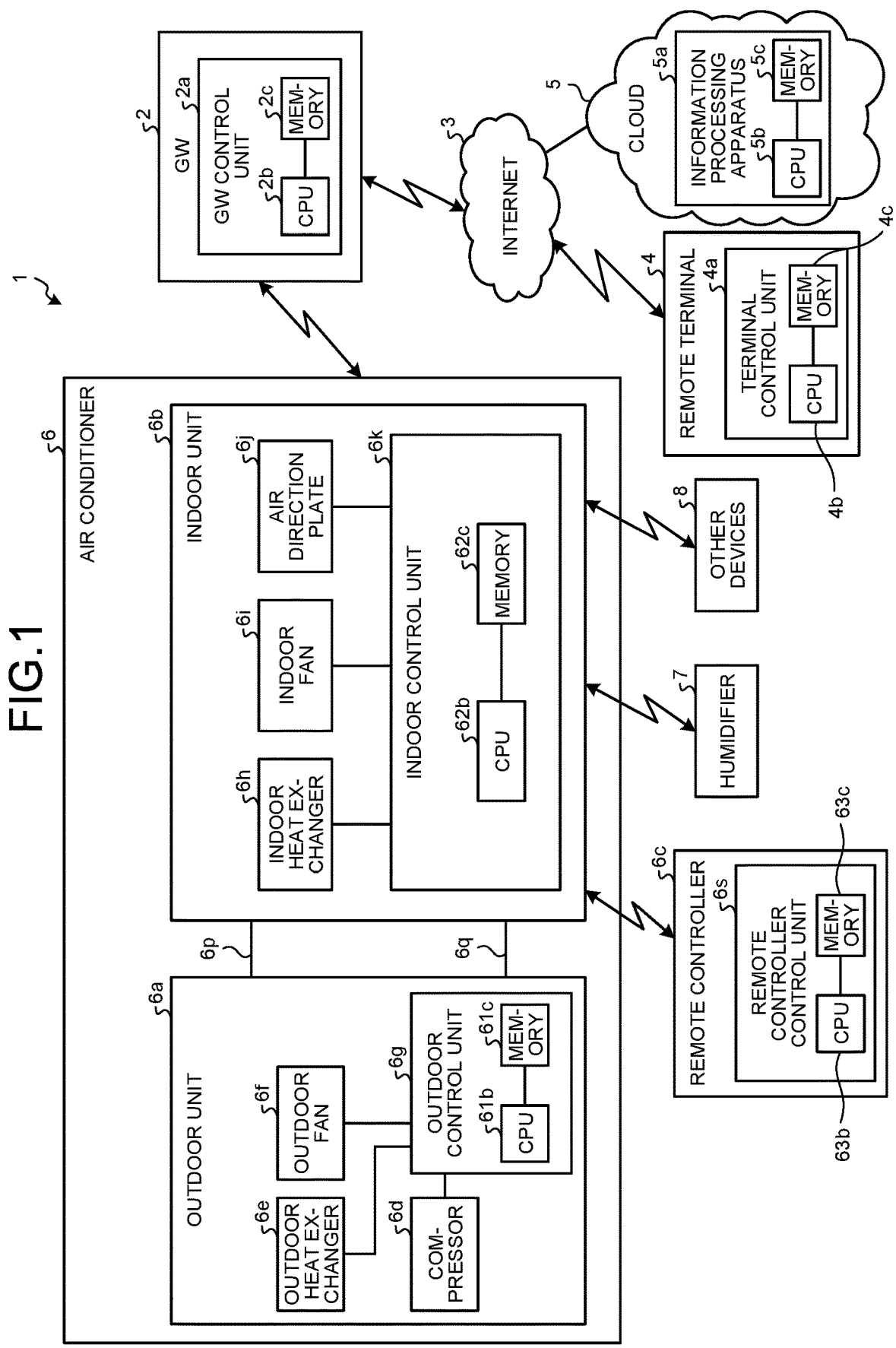
FIG. 1 is a diagram illustrating a configuration of an air conditioning system according to an embodiment.

First, a configuration of an air conditioning system according to an embodiment is described. FIG. 1 is a diagram illustrating a configuration of the air conditioning system according to an embodiment. As illustrated in FIG. 1, an air conditioning system 1 according to an embodiment includes a GW (gateway) 2, a remote terminal 4, a cloud 5, an air conditioner 6, a remote controller 6c, a humidifier 7, and another device 8.

The GW (gateway) 2 is a device that controls the air conditioner 6 in response to a manipulation instruction from the remote terminal 4 or the cloud 5 via the Internet 3 (a network). The GW 2 includes a GW control unit 2a. The GW control unit 2a controls the GW 2.

The remote terminal 4 is a terminal that accepts a manipulation instruction from a user and controls the air conditioner 6 via the Internet 3 and the GW 2. The remote terminal 4 is, for example, a smartphone or a tablet. The remote terminal 4 includes a terminal control unit 4a. The terminal control unit 4a controls the remote terminal 4.

The cloud 5 is a system that controls the air conditioner 6 via the Internet 3 and the GW 2. The cloud 5 includes a plurality of information processing apparatuses 5a, and controls the air conditioner 6 by executing software in some of the plurality of information processing apparatuses 5a.

The air conditioner 6 is an air conditioning apparatus having a cooling/heating function. The air conditioner 6 includes an outdoor unit 6a and an indoor unit 6b. The outdoor unit 6a and the indoor unit 6b are connected by a liquid pipe 6p and a gas pipe 6q.

The remote controller 6c performs wireless communication with the indoor unit 6b. The remote controller 6c is manipulated by the user, and transmits an instruction of the user to the indoor unit 6b by using wireless communication. The remote controller 6c includes a remote controller control unit 6s. The remote controller control unit 6s controls the remote controller 6c. The remote controller 6c includes an infrared remote controller and a BLE (Bluetooth (registered trademark, the same applies hereinafter) Low Energy) remote controller. The infrared remote controller communicates with the indoor unit 6b by using infrared rays. The BLE remote controller communicates with the indoor unit 6b by using Bluetooth.

The outdoor unit 6a includes a compressor 6d, an outdoor heat exchanger 6e, an outdoor fan 6f, and an outdoor control unit 6g. The outdoor unit 6a exchanges heat between outdoor air taken in the outdoor unit 6a and a refrigerant by using the outdoor heat exchanger 6e. The outdoor unit 6a draws air into the outdoor unit 6a by using the outdoor fan 6f. The refrigerant is compressed by the compressor 6d, and circulates through the outdoor unit 6a, the liquid pipe 6p, the indoor unit 6b, and the gas pipe 6q. The outdoor control unit 6g controls the outdoor unit 6a.

The indoor unit 6b includes an indoor heat exchanger 6h, an indoor fan 6i, an air direction plate 6j, and an indoor control unit 6k. The indoor unit 6b exchanges heat between indoor air taken in the indoor unit 6b and the refrigerant by using the indoor heat exchanger 6h. The indoor unit 6b takes air into the indoor unit 6b by using the indoor fan 6i, and blows out, to the interior of the room, air subjected to heat exchange with the refrigerant. The air direction plate 6j changes the direction of air blown out by the indoor fan 6i. The indoor control unit 6k controls the indoor unit 6b.

The humidifier 7 operates in coordination with the air conditioner 6. For example, when the air conditioner 6 starts heating working, also the humidifier 7 starts operation if a coordination function is set.

The other device 8 operates in coordination with the air conditioner 6 if a coordination function is set. The other device 8 is, for example, a household electric device such as a heater or an illuminator. Although only one other device 8 is illustrated in FIG. 1, the air conditioning system 1 may include a plurality of other devices 8.

The GW control unit 2a, the terminal control unit 4a, the outdoor control unit 6g, the indoor control unit 6k, and the remote controller control unit 6s implement control functions by using software. The GW control unit 2a, the terminal control unit 4a, the outdoor control unit 6g, the indoor control unit 6k, and the remote controller control unit 6s include CPUs (central processing units) 2b, 4b, 61b, 62b, and 63b as arithmetic processing units, and memories 2c, 4c, 61c, 62c, and 63c, respectively. These control units implement control functions by the CPUs 2b, 4b, 61b, 62b, and 63b executing programs stored in the memories 2c, 4c, 61c, 62c, and 63c, respectively.

The information processing apparatus 5a includes a CPU 5b as an arithmetic processing unit and a memory 5c, and controls the air conditioner 6 by the CPU 5b executing a program stored in the memory 5c.

Figure 2:
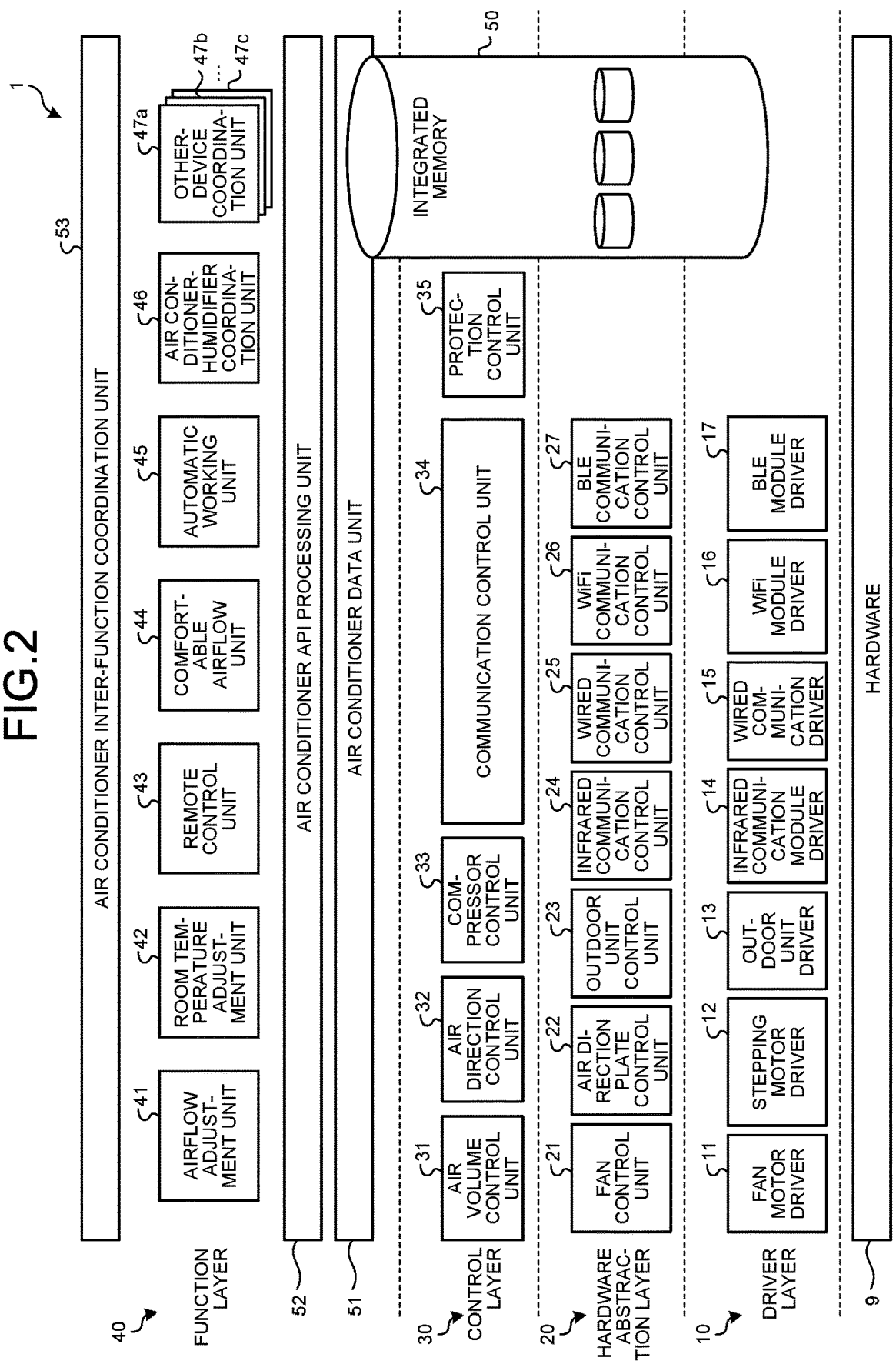
FIG. 2 is a diagram illustrating a component configuration of software included in the air conditioning system.

Next, a component configuration of software included in the air conditioning system 1 is described. FIG. 2 is a diagram illustrating a component configuration of software included in the air conditioning system 1. As illustrated in FIG. 2, the software included in the air conditioning system 1 according to the embodiment has a hierarchical structure including a driver layer 10, a hardware abstraction layer 20, a control layer 30, and a function layer 40.

The driver layer 10 is a hardware access layer that accesses hardware 9. Here, the hardware 9 includes the indoor heat exchanger 6h, the indoor fan 6i, the air direction plate 6j, the compressor 6d, the outdoor heat exchanger 6e, and the outdoor fan 6f. The components included in the driver layer 10 control the hardware 9 on the basis of instructions of the components included in the hardware abstraction layer 20, and return responses from the hardware 9 to the hardware abstraction layer 20.

The driver layer 10 includes, as components, a fan motor driver 11, a stepping motor driver 12, an outdoor unit driver 13, an infrared communication module driver 14, a wired communication driver 15, a communication module driver compatible with the Wi-Fi standard (hereinafter, a WiFi module driver 16), and a BLE module driver 17.

The fan motor driver 11, the stepping motor driver 12, and the outdoor unit driver 13 are placed in the indoor unit of the air conditioner 6. The infrared communication module driver 14, the wired communication driver 15, the WiFi module driver 16, and the BLE module driver 17 are placed in the indoor unit of the air conditioner 6, and are also remotely placed. Here, the remote placement is placement in a location away from the indoor unit 6b, such as the cloud 5, the GW 2, the remote terminal 4, or the remote controller 6c. Although the cloud 5 is a system including a plurality of information processing apparatuses 5a, herein the cloud 5 is regarded as one apparatus.

The fan motor driver 11 controls a fan motor that rotates the indoor fan 6i. The stepping motor driver 12 controls, for example, a stepping motor that operates the air direction plate 6j. The outdoor unit driver 13 controls, for example, the compressor 6d included in the outdoor unit 6a via communication with the outdoor unit 6a.

The infrared communication module driver 14 controls an infrared communication module that performs wireless communication by using infrared rays. The wired communication driver 15 controls a communication module that performs communication via a wired network. The WiFi module driver 16 controls a WiFi module that performs wireless communication compatible with the Wi-Fi standard. The BLE module driver 17 controls a Bluetooth module that performs wireless communication by using Bluetooth.

The components included in the hardware abstraction layer 20, based on instructions of the components included in the control layer 30, instruct the components included in the driver layer 10 to control the hardware 9, and return, to the control layer 30, response signals indicating that the instructions from the control layer 30 are accepted. The components included in the driver layer 10, based on instructions of the components included in the hardware abstraction layer 20, instruct that the hardware be controlled. At this time, in the case where the hardware is controlled by what is called feedback control (control of comparing the value of the controlled variable with a target value and performing a correction operation so that the value of the controlled variable coincides with the target value), the hardware outputs response signals (feedback signals) for instructions to the driver layer 10. The components of the driver layer 10 output feedback signals to the components of the hardware abstraction layer 20 in accordance with feedback signals from the hardware. A component of the hardware abstraction layer 20 that has received a feedback signal instructs a lower layer (hardware provided via the driver layer 10) to perform additional control in accordance with the received feedback signal.

The hardware abstraction layer 20 includes, as components, a fan control unit 21, an air direction plate control unit 22, an outdoor unit control unit 23, an infrared communication control unit 24, a wired communication control unit 25, a WiFi communication control unit 26, and a BLE communication control unit 27. The fan control unit 21, the air direction plate control unit 22, and the outdoor unit control unit 23 are placed in the indoor unit. The infrared communication control unit 24, the wired communication control unit 25, the WiFi communication control unit 26, and the BLE communication control unit 27 are placed in the indoor unit, and are also remotely placed.

The fan control unit 21 controls the indoor fan 6i by using the fan motor driver 11. The air direction plate control unit 22 controls the air direction plate 6j by using the stepping motor driver 12. The outdoor unit control unit 23 controls, for example, the compressor 6d included in the outdoor unit 6a by using the outdoor unit driver 13.

The infrared communication control unit 24 controls infrared communication by using the infrared communication module driver 14. The wired communication control unit 25 controls communication performed via a wired network by using the wired communication driver 15. The WiFi communication control unit 26 controls WiFi communication by using the WiFi module driver 16. The BLE communication control unit 27 controls Bluetooth communication, which is wireless communication, by using the BLE module driver 17.

The hardware abstraction layer 20 provides the control layer 30 with a means for controlling abstracted hardware 9. For example, the fan control unit 21 provides an air volume control unit 31 of the control layer 30 with a fan control means not depending on the kind of the fan motor or the kind of the fan.

The components included in the control layer 30, based on instructions of the functional units included in the function layer 40, instruct the components included in the hardware abstraction layer 20 to control abstracted hardware 9, and return responses from the hardware abstraction layer 20 to the function layer 40. The control layer 30 includes, as components, an air volume control unit 31, an air direction control unit 32, a compressor control unit 33, a communication control unit 34, and a protection control unit 35. The air volume control unit 31, the air direction control unit 32, the compressor control unit 33, and the protection control unit 35 are placed in the indoor unit. The communication control unit 34 is placed in the indoor unit, and is also remotely placed.

The air volume control unit 31 controls the volume of air outputted by the indoor fan 6i by using the fan control unit 21. The air direction control unit 32 controls the direction of air outputted by the indoor fan 6i by using the air direction plate control unit 22. The compressor control unit 33 controls, via the outdoor unit driver 13, the compressor 6d included in the outdoor unit 6a.

The communication control unit 34 controls communication between devices (remote devices) placed in different locations, such as the indoor unit 6b and the GW 2, the indoor unit 6b and the remote terminal 4, or the indoor unit 6b and the cloud 5, by using the infrared communication control unit 24, the wired communication control unit 25, the WiFi communication control unit 26, or the BLE communication control unit 27. The communication control unit 34 uses a communication protocol suitable for communication between the indoor unit 6b and a remote device from among MQTT (Message Queue Telemetry Transport), CoAP (Constrained Application Protocol), REST (Representational State Transfer), a BLE service profile, and the like.

The protection control unit 35 performs control regarding the protection of the hardware 9. For example, the protection control unit 35 performs control so that the rotation rate of the indoor fan 6i does not become too high.

The control layer 30 provides a means for implementing the functions included in the function layer 40. For example, the air volume control unit 31 and the air direction control unit 32 control the air volume and the air direction, respectively, to achieve airflow adjustment.

The functional units included in the function layer 40 perform processing of implementing the functions that the air conditioning system 1 provides to the user. On the basis of a request (a change in a setting) of the user, among the functional units included in the function layer 40, a functional unit that implements the request of the user performs processing of implementing the function. The function layer 40 includes, as functional units, an airflow adjustment unit 41, a room temperature adjustment unit 42, a remote control unit 43, a comfortable airflow unit 44, an automatic working unit 45, an air conditioner-humidifier coordination unit 46, other-device coordination units 47a, 47b, and 47c, etc., for example.

The airflow adjustment unit 41, based on a setting by the user, adjusts the air volume of the indoor unit 6b and the air direction of the indoor unit 6b by using the air volume control unit 31 and the air direction control unit 32, respectively. The room temperature adjustment unit 42 adjusts the capacity requested of the compressor 6d included in the outdoor unit 6a by using the compressor control unit 33 on the basis of the difference between a set temperature and the room temperature and the temporal change of the room temperature. The remote control unit 43 transmits a request that is set by the user by remote control with an infrared remote controller, a BLE remote controller, the remote terminal 4, or the like to the corresponding functional unit.

The comfortable airflow unit 44 detects the floor temperature, etc., and automatically adjusts the air volume of the indoor unit 6b by using the air volume control unit 31 so as to eliminate temperature unevenness in the room. The automatic working unit 45 automatically chooses a working mode (cooling, drying, blowing, or heating) on the basis of the indoor temperature and the outside air temperature, and performs working according to the chosen working mode. The air conditioner-humidifier coordination unit 46 coordinates the operation of the air conditioner 6 and the operation of the humidifier 7. The other-device coordination units 47a, 47b, 47c, etc. coordinate the operation of the air conditioner 6 and the operations of other devices 8. Examples of the other device 8 include a not-illustrated curtain, a not-illustrated lighting device, etc. For example, control signals from the other-device coordination units 47a, 47b, 47c, etc. are sent to other devices 8 through the air conditioner API processing unit, and thereby the air conditioner 6 and the other devices 8 are coordinated. By providing the other-device coordination units, coordination with other devices can be made even when the air conditioner side is not mounted with sensors needed for control of the other devices (for example, a brightness sensor, etc.).

The functional units included in the function layer 40 may be placed in the indoor unit 6*b*, or may be placed in a remote device such as the GW 2, the remote terminal 4, the cloud 5, or the remote controller 6*c*. Further, the functional units included in the function layer 40 are implemented by the CPUs 2*b*, 4*b*, 5*b*, 61*b*, 62*b*, and 63*b* executing function execution programs created individually for the functions.

The function layer 40 includes an air conditioner data unit 51, an air conditioner API (application programming interface) processing unit 52, and an air conditioner inter-function coordination unit 53. The air conditioner data unit 51, the air conditioner API processing unit 52, and the air conditioner inter-function coordination unit 53 are placed in a location where functional units are placed, such as the indoor unit 6*b*, the GW 2, the remote terminal 4, or the cloud 5.

The air conditioner data unit 51 manages data shared between functional units placed in different devices; when data is updated on the side of one remotely placed device, the air conditioner data unit 51 performs updating to the updated content (synchronizes data) also on the side of another device, and thereby maintains the consistency of data. The air conditioner data unit 51 synchronizes data distributed and stored in physical memories of the GW 2, the remote terminal 4, the cloud 5, the remote controller 6*c*, etc., and maintains the consistency of data as a whole air conditioner system. The data managed by the air conditioner data unit 51 is used for conflict control or arbitration between functional units. In this way, the air conditioner system can virtually have a memory integrated as a whole system (an integrated memory 50).

That is, the integrated memory 50 is a memory as a concept in which physical memories of the GW 2, the remote terminal 4, the cloud 5, the remote controller 6*c*, etc. are virtually integrated.

Regardless of whether functional units are physically placed in the cloud 5, the GW 2, the remote terminal 4, the remote controller 6*c*, or any other place, the air conditioner API processing unit 52 can use the same functional unit independently of the placement location (standardize functional units) by providing a common API to functional units. The air conditioner API processing unit 52 performs, via the air conditioner data unit 51, communication switching and instructions from the function layer 40 to the control layer 30. The air conditioner API processing unit 52 grasps the placement of the functional units and the components of the control layer placed in a plurality of devices, and performs control so that control signals and response signals are appropriately communicated.

The air conditioner inter-function coordination unit 53 performs control of coordination between remotely placed functional units. For example, the air conditioner inter-function coordination unit 53 performs an operation of changing a setting by remotely placed functional units (for example, whether to activate the airflow adjustment function of the airflow adjustment unit or not), etc.

Figure 4:
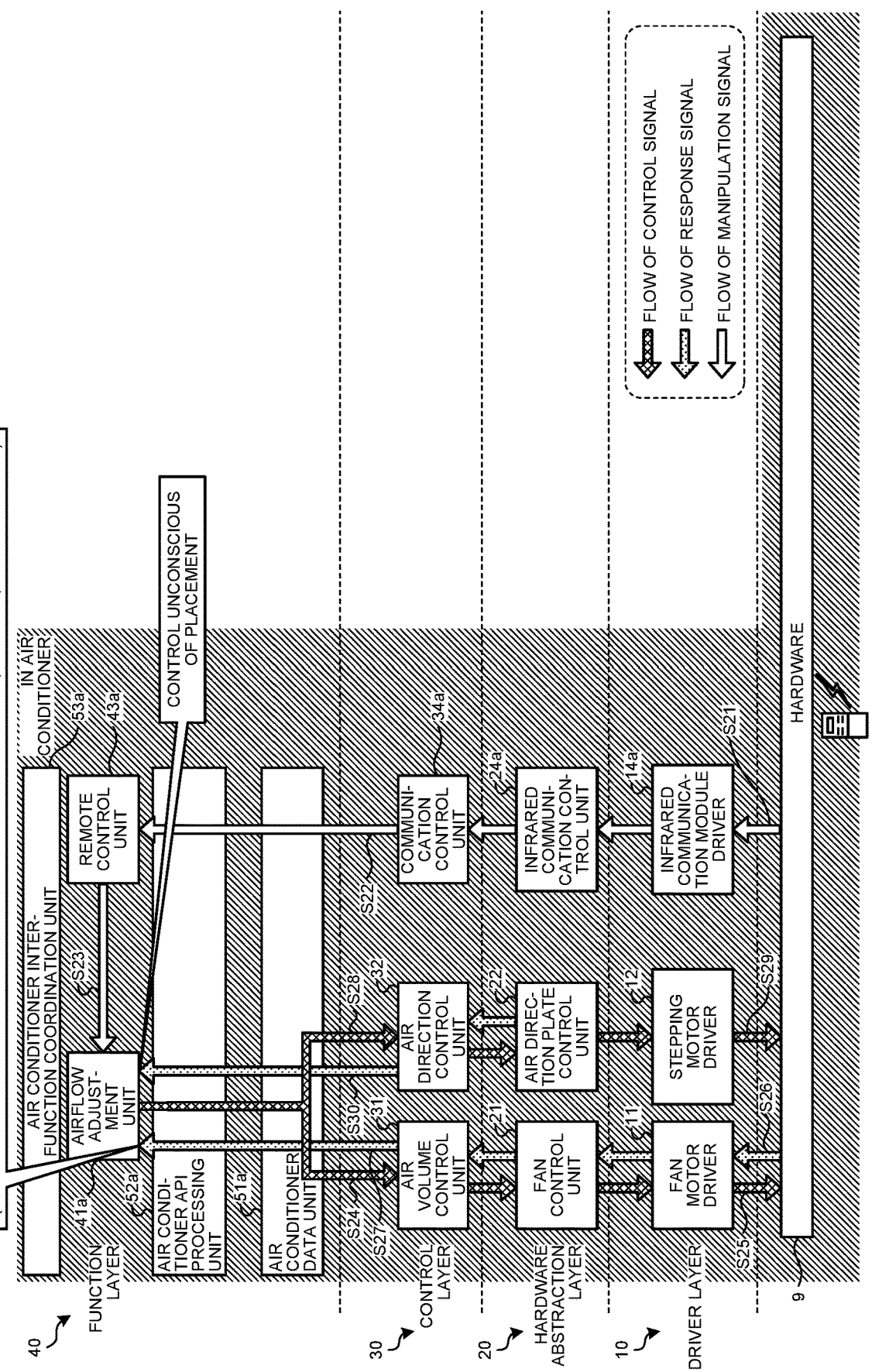
FIG. 4 is a diagram illustrating a sequence of processing by the air conditioning system in the case where an airflow adjustment unit is placed in an indoor unit and a user changes the air volume or the air direction from an infrared remote controller.
Figure 5:
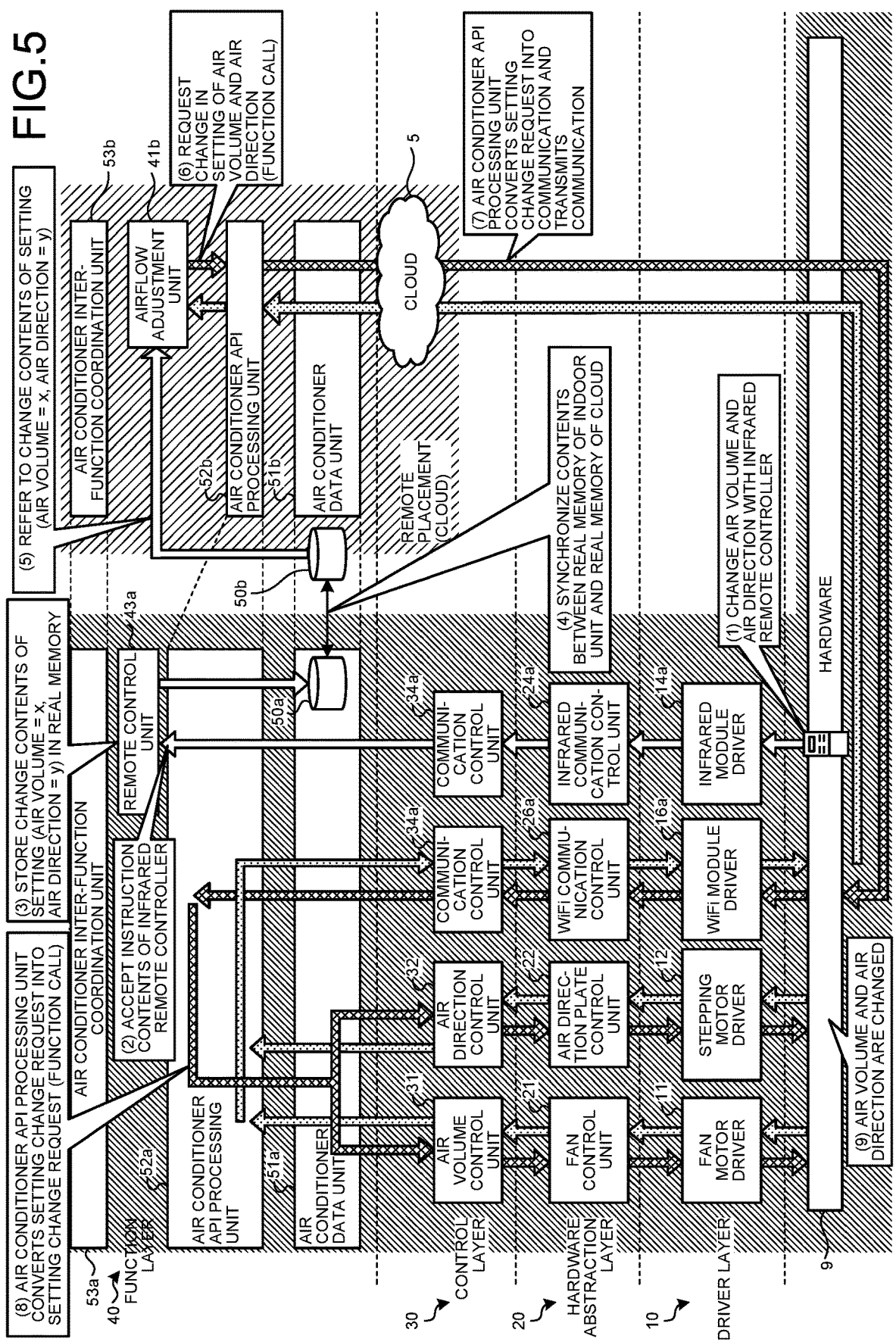
FIG. 5 is a diagram illustrating a sequence of processing by the air conditioning system, centering on processing in a function layer.
Figure 6:
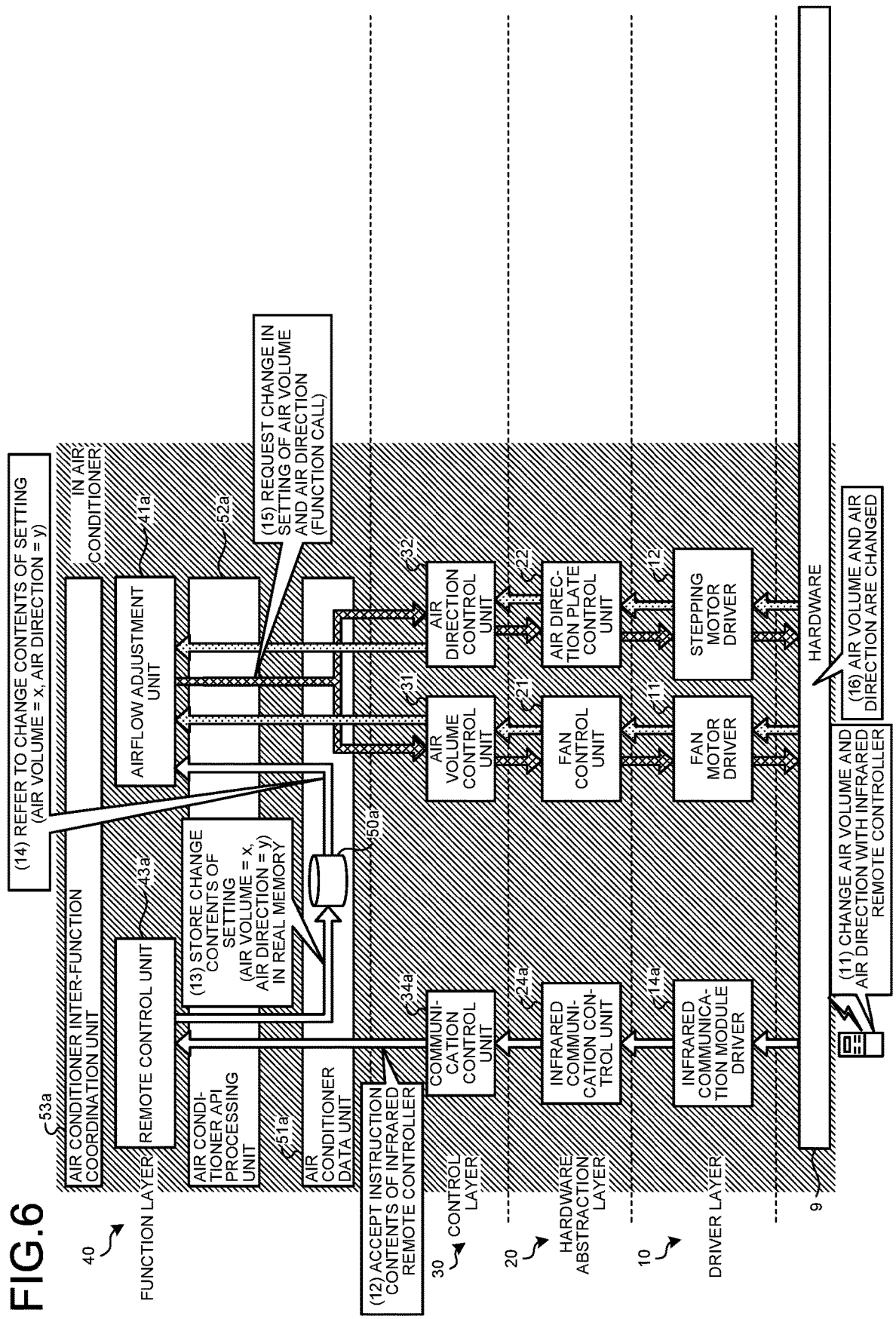
FIG. 6 is a diagram illustrating a case where an airflow adjustment unit is placed in a room.

Next, sequences of processing of the air conditioning system 1 are described using FIG. 3 to FIG. 6, taking airflow adjustment as an example. In FIG. 6, in the indoor unit 6*b*, an air conditioner data unit 51*a*, an air conditioner API processing unit 52*a*, an air conditioner inter-function coordination unit 53*a*, a remote control unit 43*a*, a communication control unit 34*a*, a WiFi communication control unit 26*a*, a WiFi module driver 16*a*, an infrared communication control unit 24*a*, and an infrared communication module driver 14*a* operate. In the cloud 5, an air conditioner data unit 51*b*, an air conditioner API processing unit 52*b*, and an air conditioner inter-function coordination unit 53*b* operate. A real memory 50*a* is, out of the integrated memory 50, which is a virtual memory, a physical memory placed in the indoor unit 6*b*, and a real memory 50*b* is, out of the integrated memory 50, which is a virtual memory, a physical memory placed in the cloud 5.

Figure 3:
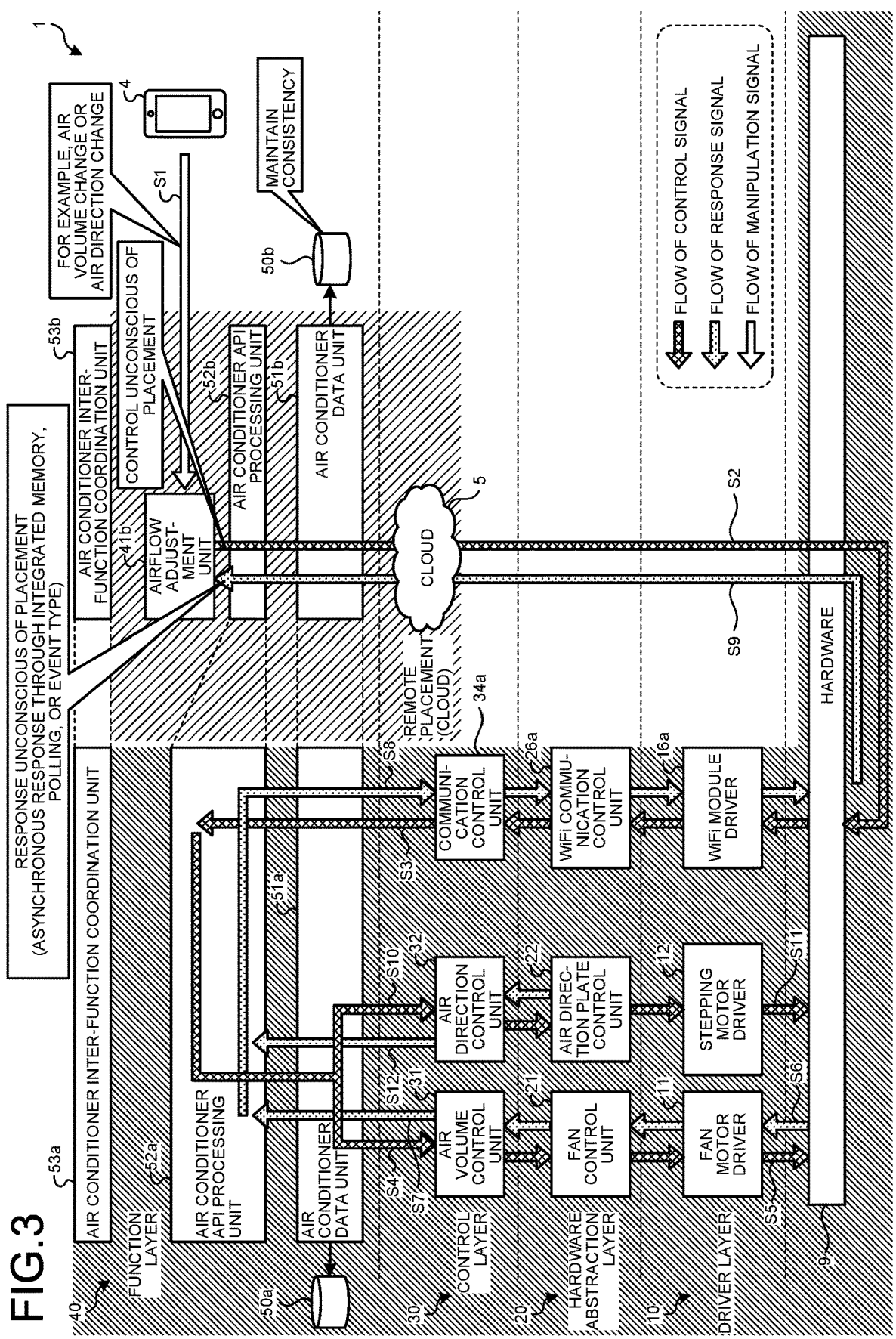
FIG. 3 is a diagram illustrating a sequence of processing by the air conditioning system in the case where an airflow adjustment unit is placed in a cloud and a user changes the air volume or the air direction from a remote terminal.

First, a case where an airflow adjustment unit 41*b* is placed in the cloud 5 and the user changes the air volume or the air direction from the remote terminal 4 is described. FIG. 3 is a diagram illustrating a sequence of processing by the air conditioning system 1 in the case where an airflow adjustment unit 41*b* is placed in the cloud 5 and the user changes the air volume or the air direction from the remote terminal 4. As illustrated in FIG. 3, the airflow adjustment unit 41*b* placed in the cloud 5 receives an air volume change instruction from the remote terminal 4 (S1). Here, first, a case where the air volume is changed is described; the airflow adjustment unit 41*b* outputs a control signal that requests a change in the setting of the air volume or the air direction regardless of the placement location of the airflow adjustment unit 41*b* itself. Specifically, the airflow adjustment unit 41*b* outputs an air volume change control signal to the air conditioner API processing unit 52*b*. Since the air conditioner API processing unit 52*b* grasps that the air volume control unit 31 and the air direction control unit 32, which are components of the control layer, are in the main body device, the air conditioner API processing unit 52*b* converts the air volume change control signal into data for communication with the main body device (a WiFi signal), and transmits the data to the main body device via the Internet (S2). Here, the main body device is the air conditioner 6.

The air conditioner API processing unit 52*b* transmits the data for communication to the main body device via the air conditioner data unit 51*b*, and the air conditioner data unit 51*b* changes the setting of the air volume and stores the changed setting in the real memory 50*b*. The air conditioner data unit 51*b* synchronizes with the air conditioner data unit 51*a* of the indoor unit 6*b* to maintain the consistency of the integrated memory 50. Thus, the air conditioner data unit 51*a* can acquire the changed setting of the air volume from the real memory 50*a* of the indoor unit 6*b*.

The WiFi module driver 16*a* of the driver layer 10 of the main body device receives data that has been transmitted from the cloud 5 via the Internet, and outputs the data to the WiFi communication control unit 26*a* of the hardware abstraction layer 20. The WiFi communication control unit 26*a* checks whether the data received by the WiFi module driver 16*a* is proper received data or not; when the data is proper received data, the WiFi communication control unit 26*a* outputs the received data to the communication control unit 34*a* of the control layer 30.

The communication control unit 34*a* performs signal analysis on the data (received data) transmitted from the air conditioner API processing unit 52*b*; when the data is the air volume change control signal from the airflow adjustment unit 41*b* on the cloud 5 side, the communication control unit 34*a* sends the air volume change control signal to the air conditioner API processing unit 52*a* on the main body side (S3).

Since the air conditioner API processing unit 52*a* grasps the placement of the air volume control unit 31 to receive the air volume change control signal, the air conditioner API processing unit 52a can output the air volume change control signal toward the air volume control unit 31 (S4). The air conditioner API processing unit 52a also causes the air conditioner data unit 51a to store the fact that the air volume change instruction has been issued.

The air volume control unit 31 determines the target fan rotation rate after change on the basis of the air volume change instruction, and outputs the target fan rotation rate as a control signal to the fan control unit 21 of the hardware abstraction layer 20. At the time point when the acceptance of the air volume change instruction from the air volume control unit 31 is completed, the fan control unit 21 outputs an acceptance response signal to the air volume control unit 31; and calculates the controlled variable of the fan motor from the difference between the current actual operating fan rotation rate and the target fan rotation rate after change, and outputs the controlled variable of the fan motor as a control signal to the fan motor driver 11 of the driver layer 10. The fan motor driver 11 outputs a signal to a fan motor drive circuit in accordance with the controlled variable of the fan motor, and controls the fan motor (S5).

After that, the fan motor driver 11 of the driver layer 10 inputs, from a fan motor rotation rate feedback circuit of the hardware 9, a feedback signal (pulse signal) of the actual operating fan rotation rate after the controlled variable of the fan motor is changed, as a response signal (S6). The fan motor driver 11 outputs the time interval of the feedback signal input (the time interval of the pulse signal) as a response signal to the fan control unit 21 of the hardware abstraction layer 20. The fan control unit 21 calculates the rotation rate of the fan motor from the time interval of the feedback signal input (the time interval of the pulse signal), and instructs the fan motor driver 11 to increase a command voltage value (the ON time of a PWM signal) up to a predetermined rotation rate. At the time point when the acceptance of the air volume change instruction from the air volume control unit 31 is completed, the fan control unit 21 outputs an acceptance response signal to the air volume control unit 31; and the air volume control unit 31 that has received the acceptance response signal outputs a response signal to the air conditioner API processing unit 52a of the function layer 40 (S7).

The air conditioner API processing unit 52a performs data conversion into a response signal suitable for the control signal transmitted from the airflow adjustment unit 41b of the function layer 40 placed in the cloud 5, and outputs the response signal to the communication control unit 34a of the control layer 30 (S8).

In order to communicate with the cloud 5, the communication control unit 34a chooses WiFi communication, and outputs a response signal to the WiFi communication control unit 26a of the hardware abstraction layer 20. The WiFi communication control unit 26a converts the inputted response signal into a Universal Asynchronous Receiver/Transmitter (UART) signal, and outputs the UART signal to the WiFi module driver 16a of the driver layer 10. The WiFi module driver 16a transmits a response signal to the cloud 5 through a communication circuit (S9).

In this way, the fan motor driver 11, the fan control unit 21, the air volume control unit 31, and the air conditioner API processing unit 52a sequentially convert a response signal of the previous layer into a suitable format, and sequentially output the converted response signal to the next layer; thus, the air conditioning system 1 can transmit a response signal from the hardware 9 to the cloud 5. Note that the air volume control unit 31 makes a response regardless of the placement of the airflow adjustment unit 41. Specifically, the air volume control unit 31 responds to the air conditioner API processing unit 52a, and the air conditioner API processing unit 52a responds to the communication control unit 34a. Details of an event-type response will be described later. The air conditioner API processing unit 52a may make a response by asynchronous response via an integrated memory or polling.

The air conditioner API processing unit 52b of the function layer 40 of the cloud 5 inputs, as a response signal, a signal transmitted from the main body device via the Internet, converts the inputted response signal, and outputs the converted response signal to the airflow adjustment unit 41b. Thus, the air volume change processing is completed.

Next, an air direction change is described. As illustrated in FIG. 3, the airflow adjustment unit 41b placed in the cloud 5 receives an air direction change instruction from the remote terminal 4 (S1). Then, the airflow adjustment unit 41b outputs the air direction change control signal to the air conditioner API processing unit 52b regardless of the placement of the airflow adjustment unit 41b itself. Since the air conditioner API processing unit 52b grasps that the air direction control unit 32, which are components of the control layer, are in the main body device, the air conditioner API processing unit 52b converts the air direction change control signal into data for communication with the main body device (a WiFi signal), and transmits the data to the main body device via the Internet (S2).

The air conditioner API processing unit 52b transmits the data for communication to the main body device via the air conditioner data unit 51b, and the air conditioner data unit 51b changes the setting of the air direction and stores the changed setting in the real memory 50b. The air conditioner data unit 51b synchronizes with the air conditioner data unit 51a to maintain the consistency of the integrated memory 50. Thus, the air conditioner data unit 51a can acquire the changed setting of the air direction from the real memory 50a of the indoor unit 6b.

The WiFi module driver 16a of the driver layer 10 of the main body device receives data that has been transmitted from the cloud 5 via the Internet, and outputs the data to the WiFi communication control unit 26a of the hardware abstraction layer 20. The WiFi communication control unit 26a checks whether the data received by the WiFi module driver 16a is proper received data or not; when the data is proper received data, the WiFi communication control unit 26a outputs the received data to the communication control unit 34a of the control layer 30.

The communication control unit 34a performs signal analysis on the data (received data) transmitted from the air conditioner API processing unit 52b; when the data is the air direction change control signal from the airflow adjustment unit 41b on the cloud 5 side, the communication control unit 34a sends the air direction change control signal to the air conditioner API processing unit 52a on the main body side (S3).

Since the air conditioner API processing unit 52a grasps the placement of the air direction control unit 32 to receive the air direction change control signal, the air conditioner API processing unit 52a can output the air direction change control signal toward the air direction control unit 32 (S10). The air conditioner API processing unit 52a also causes the air conditioner data unit 51a to store the fact that the air direction change instruction has been issued.

The air direction control unit 32 determines the number of pulses for the target air direction position after change on the basis of the air direction change instruction, and outputs the number of pulses for the target air direction position as a control signal to the air direction plate control unit 22 of the hardware abstraction layer 20. At the time point when the acceptance of the air direction change instruction from the air direction control unit 32 is completed, the air direction plate control unit 22 outputs an acceptance response signal to the air direction control unit 32; and determines the driving direction of the stepping motor from the number of pulses for the current actual operating air direction position and the number of pulses for the target air direction position after change, and outputs the controlled variable of the stepping motor as a control signal to the stepping motor driver 12 of the driver layer 10. The stepping motor driver 12 outputs a signal to a stepping motor drive circuit at a timing according to the controlled variable of the stepping motor, and drives the stepping motor; thus, controls the air direction position (S11).

With regard to the stepping motor that controls the air direction plate, since there is no hardware circuit that detects the air direction position, there is no response signal input from a lower layer to the stepping motor driver 12 of the driver layer 10 or the air direction plate control unit 22 of the hardware abstraction layer 20. At the time point when the acceptance of the air direction change instruction from the air direction control unit 32 of the control layer 30 is completed, the air direction plate control unit 22 outputs an acceptance response signal to the air direction control unit 32. The air direction control unit 32 outputs a response signal to the air conditioner API processing unit 52a of the function layer 40 (S12).

The air conditioner API processing unit 52a performs data conversion into a response signal suitable for the control signal transmitted from the airflow adjustment unit 41b of the function layer 40 placed in the cloud 5, and outputs the response signal to the communication control unit 34a of the control layer 30 (S8).

In order to communicate with the cloud 5, the communication control unit 34a chooses WiFi communication, and outputs a response signal to the WiFi communication control unit 26a of the hardware abstraction layer 20. The WiFi communication control unit 26a converts the inputted response signal into a UART signal, and outputs the UART signal to the WiFi module driver 16a of the driver layer 10. The WiFi module driver 16a transmits a response signal to the cloud 5 through a communication circuit (S9).

The air conditioner API processing unit 52b of the function layer 40 of the cloud 5 inputs, as a response signal, a signal transmitted from the main body device via the Internet, converts the inputted response signal, and outputs the converted response signal to the airflow adjustment unit 41b. Thus, the air direction change processing is completed.

Next, a case where an airflow adjustment unit 41a is placed in the indoor unit 6b and the user has changed the air volume or the air direction from an infrared remote controller is described. FIG. 4 is a diagram illustrating a sequence of processing by the air conditioning system 1 in the case where an airflow adjustment unit 41a is placed in the indoor unit 6b and the user changes the air volume or the air direction from an infrared remote controller. As illustrated in FIG. 4, the infrared communication module driver 14a of the driver layer 10 of the indoor unit 6b receives an air volume change instruction based on a manipulation of the user from an infrared remote controller (S21). Then, the infrared communication module driver 14a outputs the received signal to the infrared communication control unit 24a.

The infrared communication control unit 24a analyzes the received signal and identifies the received signal as an air volume change instruction, and outputs the air volume change instruction to the communication control unit 34a of the control layer 30. The communication control unit 34a assesses the priority in comparison with instruction inputs from other communication means, etc.; when there is no problem, the communication control unit 34a outputs the air volume change instruction to the air conditioner API processing unit 52a of the function layer 40. At this time, since the air conditioner API processing unit 52a grasps that the remote control unit 43a, which is a functional unit, is placed in the function layer on the main body side, the air conditioner API processing unit 52a transmits the air volume change instruction to the remote control unit 43a (S22). The remote control unit 43a directly outputs the air volume change instruction to the airflow adjustment unit 41a of the function layer 40 in the main body device (S23). The airflow adjustment unit 41a of the function layer 40 that has received the air volume change instruction outputs an air volume change control signal to the air conditioner API processing unit 52a regardless of the placement location of the airflow adjustment unit 41a itself. Since the air volume change control signal is a control signal from the airflow adjustment unit 41a in the same device, the air conditioner API processing unit 52a outputs the air volume change control signal as it is without data conversion into communication data to the air volume control unit 31 of the control layer 30 (S24).

The air volume control unit 31 determines the target fan rotation rate after change on the basis of the air volume change instruction, and outputs the target fan rotation rate as a control signal to the fan control unit 21 of the hardware abstraction layer 20. The fan control unit 21 calculates the controlled variable of the fan motor from the difference between the current actual operating fan rotation rate and the target fan rotation rate after change, and outputs the controlled variable of the fan motor as a control signal to the fan motor driver 11 of the driver layer 10. The fan motor driver 11 outputs a signal to a fan motor drive circuit at a timing in accordance with the controlled variable of the fan motor, and controls the fan motor (S25).

After that, the fan motor driver 11 of the driver layer 10 inputs, from a fan motor rotation rate feedback circuit of the hardware 9, a feedback signal of the actual operating fan rotation rate after the controlled variable of the fan motor is changed, as a response signal (S26). The fan motor driver 11 outputs the time interval of the feedback signal input as a response signal to the fan control unit 21 of the hardware abstraction layer 20. At the time point when the acceptance of the air volume change instruction from the air volume control unit 31 of the control layer 30 is completed, the fan control unit 21 outputs an acceptance response signal to the air volume control unit 31. The air volume control unit 31 outputs a response signal to the air conditioner API processing unit 52a of the function layer 40 regardless of the placement location of the airflow adjustment unit 41 (S27).

Since the airflow adjustment unit 41a is in the same device, the air conditioner API processing unit 52a outputs the response signal as it is without data conversion to the airflow adjustment unit 41a. Thus, the air volume change processing is completed.

As illustrated in FIG. 3 and FIG. 4, the airflow adjustment unit 41, regardless of whether it is placed in the cloud 5 or the indoor unit 6b, upon receiving an air volume change instruction, outputs an air volume change control signal to the air conditioner API processing unit 52 regardless of the placement location of the airflow adjustment unit 41 itself. Then, in the case where the air conditioner API processing unit 52 is placed in the cloud 5, since the air conditioner API processing unit 52 grasps that the air volume control unit 31 is placed in the main body device, the air conditioner API processing unit 52 converts the air volume change control signal into data for communication with the main body device, and transmits the data to the main body device. Hence, the airflow adjustment unit 41b can control the air volume of the indoor unit 6b from the cloud 5 by the same processing as that in the case of being placed in the indoor unit 6b. Thus, in the air conditioning system 1, the airflow adjustment unit 41 can be placed in either of the indoor unit 6b and the cloud 5.

Next, an air direction change is described. As illustrated in FIG. 4, the infrared communication module driver 14a of the driver layer 10 of the indoor unit 6b receives an air direction change instruction based on a manipulation of the user from an infrared remote controller (S21). Then, the infrared communication module driver 14a outputs the received signal to the infrared communication control unit 24a.

The infrared communication control unit 24a analyzes the received signal and identifies the received signal as an air direction change instruction, and outputs the air direction change instruction to the communication control unit 34a of the control layer 30. The communication control unit 34a assesses the priority in comparison with instruction inputs from other communication means, etc.; when there is no problem, the communication control unit 34a outputs the air direction change instruction to the air conditioner API processing unit 52a of the function layer 40. At this time, since the air conditioner API processing unit 52a grasps that the remote control unit 43a, which is a functional unit, is placed in the function layer on the main body side, the air conditioner API processing unit 52a transmits the air direction change instruction to the remote control unit 43a (S22). The remote control unit 43a directly outputs the air direction change instruction to the airflow adjustment unit 41a of the function layer 40 in the main body device (S23). The airflow adjustment unit 41a of the function layer 40 that has received the air direction change instruction outputs an air direction change control signal to the air conditioner API processing unit 52a without being conscious the placement location of the airflow adjustment unit 41a itself. Since the air direction change control signal is a control signal from the airflow adjustment unit 41a in the same device, the air conditioner API processing unit 52a outputs the air direction change control signal as it is without data conversion into communication data to the air direction control unit 32 of the control layer 30 (S28).

The air direction control unit 32 determines the target air direction position and the number of pulses for the target air direction position after change on the basis of the air direction change instruction, and outputs the number of pulses for the target air direction position as a control signal to the air direction plate control unit 22 of the hardware abstraction layer 20. The air direction plate control unit 22 determines the driving direction of the stepping motor from the number of pulses for the current actual operating air direction position and the number of pulses for the target air direction position after change. Then, the air direction plate control unit 22 outputs a stepping motor drive signal as a control signal to the stepping motor driver 12 of the driver layer 10 until the number of pulses reaches the number of pulses for the target air direction position. The stepping motor driver 12 outputs a signal to a stepping motor drive circuit, and drives the stepping motor; thus, controls the air direction position (S29).

With regard to the stepping motor that controls the air direction plate, since there is no hardware circuit that detects the air direction position, there is no response signal input from a lower layer to the stepping motor driver 12 of the driver layer 10 or the air direction plate control unit 22 of the hardware abstraction layer 20. At the time point when the acceptance of the air volume change instruction from the air direction control unit 32 of the control layer 30 is completed, the air direction plate control unit 22 outputs an acceptance response signal to the air direction control unit 32. Similarly, at the time point when the acceptance of the air direction change instruction from the air conditioner API processing unit 52a of the function layer 40 is completed, the air direction control unit 32 outputs a response signal to the air conditioner API processing unit 52a regardless of the placement location of the airflow adjustment unit 41 (S30).

Since the airflow adjustment unit 41a is in the same device, the air conditioner API processing unit 52a outputs the response signal as it is without data conversion to the airflow adjustment unit 41a. Thus, the air direction change processing is completed.

Next, a case where an airflow adjustment unit 41b is placed in the cloud 5 and the user changes the air volume or the air direction from an infrared remote controller is described. FIG. 5 is the same as FIG. 3 in that an airflow adjustment unit 41b is placed in the cloud 5, but is different in that the user changes the air volume or the air direction from an infrared remote controller. FIG. 5 is a diagram illustrating a sequence of processing by the air conditioning system 1, centering on processing in the function layer 40.

As illustrated in FIG. 5, the user changes the air volume and the air direction with an infrared remote controller (1). The remote control unit 43a accepts a change instruction (2), and stores the change contents of the setting (air volume=x, air direction=y) in the real memory 50a of the indoor unit 6b (3). The air conditioner data unit 51a of the indoor unit 6b and the air conditioner data unit 51b of the cloud 5 coordinate to synchronize the contents between the real memory 50a of the indoor unit 6b and the real memory 50b of the cloud 5 (4). The air conditioner data unit 51a of the indoor unit 6b and the air conditioner data unit 51b of the cloud 5 synchronize the contents between the real memory 50a and the real memory 50b by copying the contents of the real memory 50a to the real memory 50b. When the setting is changed, the airflow adjustment unit 41b of the cloud 5 refers to the change contents of the setting in the real memory 50b (5), and uses a function call to request the air conditioner API processing unit 52b to change the setting of the air volume and the air direction (6). The air conditioner API processing unit 52b converts the setting change request into communication data, and transmits the communication data to the indoor unit 6b (7).

The air conditioner API processing unit 52b of the indoor unit 6b receives the setting change request, and converts the setting change request into an air volume setting change request and an air direction setting change request (a function call) (8). Then, the air volume and the air direction are changed on the basis of the air volume setting change request and the air direction setting change request (9).

FIG. 6 illustrates a case where an airflow adjustment unit 41a is placed in the indoor unit 6b. As illustrated in FIG. 6, the user changes the air volume and the air direction with an infrared remote controller (11). The remote control unit 43a accepts a change instruction (12), and stores the change contents of the setting (air volume=x, air direction=y) in the real memory 50a of the indoor unit 6b (13).

When the setting is changed, the airflow adjustment unit 41a of the indoor unit 6b refers to the change contents of the setting in the real memory 50a (14), and uses a function call to request the air conditioner API processing unit 52a to change the setting of the air volume and the air direction (15). The air conditioner API processing unit 52a requests the air volume control unit 31 to change the setting of the air volume, and requests the air direction control unit 32 to change the setting of the air direction. Then, the air volume and the air direction are changed (16).

As illustrated in FIG. 5 and FIG. 6, when a setting in the integrated memory 50 is changed, the airflow adjustment unit 41, regardless of whether it is placed in the cloud 5 or the indoor unit 6b, requests the air conditioner API processing unit 52 to change the setting of the air volume and the air direction. Then, when placed in the cloud 5, the air conditioner API processing unit 52 converts the setting change request into communication data, and transmits the communication data to the indoor unit 6b. Hence, the airflow adjustment unit 41b can control the air volume and the air direction of the indoor unit 6b from the cloud 5 by the same processing as that in the case of being placed in the indoor unit 6b. Thus, in the air conditioning system 1, the airflow adjustment unit 41 can be placed in either of the indoor unit 6b and the cloud 5.

Next, details of an event-type response in which a response signal is processed when an event (reception of a response signal) occurs are described. FIG. 7 is a diagram illustrating a case where an airflow adjustment unit 41b is placed in the cloud 5 (that is, the case of the embodiments illustrated in FIG. 3 and FIG. 5) and the airflow adjustment unit 41b receives, from the air conditioner API processing unit 52a, event-type responses to an air volume change instruction and an air direction change instruction. FIG. 7 illustrates, as an example, a case where the MQTT protocol is employed and a publish-subscribe model in which when a response signal is published to an MQTT server, the response signal is transmitted to a subscribing terminal is applied.

As illustrated in FIG. 7, the airflow adjustment unit 41b registers, in the air conditioner API processing unit 52b, Callback functions that expect responses of an air volume change and an air direction change from the indoor unit side (21). That is, the airflow adjustment unit 41b registers, in the air conditioner API processing unit 52b, an air volume Callback function and an air direction Callback function while associating them with air volume control and air direction control, respectively.

The air conditioner API processing unit 52b holds the Callback functions while associating them with events (22). That is, the air conditioner API processing unit 52b holds {an air direction Callback function, an air direction control event} and {an air volume Callback function, an air volume control event}. Further, the air conditioner API processing unit 52b registers, from a communication control unit 34b to an MQTT server 54, an air volume control event and an air direction control event on the indoor unit side, as messages to be subscribed to.

When an event (an acceptance response of an air volume change signal or an acceptance response of an air direction change signal) occurs, the control unit (the air volume control unit 31 or the air direction control unit 32) of the indoor unit 6b delivers the event to the air conditioner API processing unit 52a (23). The air conditioner API processing unit 52a publishes the event that has occurred in order to convey information of the event to the cloud side (24). That is, the air conditioner API processing unit 52a publishes an air volume control event when an acceptance response of an air volume change signal occurs as an event, and publishes an air direction control event when an acceptance response of an air direction change signal occurs as an event. The published event is delivered as a message from the communication control unit 34a to the cloud side via the MQTT server.

The air conditioner API processing unit 52b of the cloud 5 receives an event delivered from the communication control unit 34a via the MQTT server, and activates a Callback function associated with the received event (25). That is, the air conditioner API processing unit 52b activates an air volume Callback function when the published event is an air volume control event, and activates an air direction Callback function when the published event is an air direction control event.

In this way, the airflow adjustment unit 41b registers a Callback function in the air conditioner API processing unit 52b. Then, the air conditioner API processing unit 52b holds the Callback function while associating it with an event; when an event is published, the air conditioner API processing unit 52b activates a Callback function associated with the published event. Thus, the airflow adjustment unit 41b can receive a response to an instruction.

As described hereinabove, the air conditioning system 1 includes an air conditioner API processing unit 52a in the indoor unit 6b, and includes an air conditioner API processing unit 52b in the cloud 5 as an example of a remote device. The functional units placed in the cloud 5 perform processing via the air conditioner API processing unit 52b and the air conditioner API processing unit 52a. That is, the air conditioner API processing unit 52a and the air conditioner API processing unit 52b function as a platform (platform API) with which access (control, information collection, etc.) to the main body of the air conditioning apparatus can be performed from various locations (the air conditioning apparatus, a cloud, etc.). Thus, in the air conditioning system 1, functional units can be remotely placed.

Further, in the embodiment, the functional units included in the function layer 40 perform similar processing regardless of whether they are placed in the indoor unit 6b or a remote device. Thus, the air conditioning system 1 can develop a common functional unit not depending on the placement location, and can easily develop functional units. For example, it is not needed to provide communication processing as processing of the functional unit, and the air conditioner API processing unit 52 performs communication via the communication control unit 34 when needed. Thus, the air conditioning system 1 can develop a common functional unit not depending on the placement location, and can easily develop functional units.

Further, in the embodiment, when a functional unit is placed in the cloud 5, the air conditioner API processing unit 52b converts an instruction from the functional unit into a format suitable for communication, and transmits the converted instruction to the air conditioner API processing unit 52a. Then, the air conditioner API processing unit 52a converts the instruction received from the air conditioner API processing unit 52b into a format suitable for the control layer 30, and outputs the converted instruction to a component of the control layer 30. Then, the component of the control layer 30 converts the instruction received from the air conditioner API processing unit 52a into a format suitable for the hardware abstraction layer 20, and outputs the converted instruction to a component of the hardware abstraction layer 20. Then, the component of the hardware abstraction layer 20 converts the instruction received from the component of the control layer 30 into a format suitable for the driver layer 10, and output the converted instruction to a component of the driver layer 10. Thus, the air conditioning system 1 can develop a functional unit and a component based only on the interface with the layer immediately below, and can easily develop functional units and components.

Further, in the embodiment, a remotely placed functional unit receives a response to an instruction to the indoor unit 6b on the basis of a publish-subscribe model, and therefore can check that the indoor unit 6b has executed the instruction.

Further, in the embodiment, a functional unit can share data with another functional unit by means of the virtual integrated memory 50 without depending on the placement location, and can easily exchange data with the other functional unit. Further, in the embodiment, the air conditioner data unit 51 maintains the consistency of data between functional units by means of the virtual integrated memory 50. Thus, the hardware 9 of the indoor unit 6b can stably operate without receiving contradictory instructions from identical functional units placed in different locations.

REFERENCE SIGNS LIST

1 AIR CONDITIONING SYSTEM
2 GW
2b, 4b, 5b, 61b, 62b, 63b CPU
4 REMOTE TERMINAL
5 CLOUD
6 AIR CONDITIONER
6a OUTDOOR UNIT
6b INDOOR UNIT
6c REMOTE CONTROLLER
10 DRIVER LAYER
20 HARDWARE ABSTRACTION LAYER
30 CONTROL LAYER
40 FUNCTION LAYER
50 INTEGRATED MEMORY
51, 51a, 51b AIR CONDITIONER DATA UNIT
52, 52a, 52b AIR CONDITIONER API PROCESSING UNIT
53, 53a, 53b AIR CONDITIONER INTER-FUNCTION COORDINATION UNIT

The invention claimed is:

1. An air conditioning system, comprising:
a main body device including a hardware group that includes at least a compressor, a heat exchanger, and a blower fan, and first software that controls the hardware group; and
a remote device including at least an arithmetic processing unit and second software that controls the arithmetic processing unit, the remote device being connected to the main body device via a network,
wherein the first software of the main body device includes:
a hardware access layer including a driver group that drives each piece of the hardware group;
a control layer that controls the hardware group via the driver group; and
a main body device-side function layer that accepts a first order to the main body device and outputs a first instruction to the control layer,
the second software of the remote device includes:
a remote device-side function layer that accepts a second order to the main body device and outputs a second instruction to the control layer via the main body device-side function layer, and
a function execution program that executes at least one function of the main body device is in at least one of the main body device-side function layer or the remote device-side function layer.

2. The air conditioning system according to claim 1, wherein the function execution program is individually created for each function of the main body device.

3. The air conditioning system according to claim 1, wherein, in a case where the function execution program is in the remote device-side function layer:
the second order accepted by the remote device-side function layer is converted into a first format suitable for being inputted to the main body device-side function layer via the network in the remote device-side function layer and is output by the remote device-side function layer to the main body device-side function layer;
the first order accepted by the main body device-side function layer is converted into a second format suitable for the control layer and is output by the main body device-side function layer to the control layer as the first instruction;
the first instruction is converted into a third format suitable for the hardware access layer in the control layer and is output by the control layer to the hardware access layer as a third instruction; and
the third instruction is converted into a fourth format suitable for a piece of the hardware group in the hardware access layer and is output by the hardware access layer to the piece of the hardware group.

4. The air conditioning system according to claim 3, wherein a response signal that the piece of the hardware group returns in response to the converted third instruction is sequentially converted into suitable formats in the hardware access layer, the control layer, the main body device-side function layer, and the remote device-side function layer, and is sequentially output to respective layers.

5. The air conditioning system according to claim 1, wherein a first physical memory included in the main body device and a second physical memory included in the remote device are integrated as a virtual integrated memory in which consistency is maintained, and
the function execution program exchanges data with another function execution program by using the virtual integrated memory.

6. The air conditioning system according to claim 1, wherein the first software of the main body includes a hierarchical structure, the hierarchical structure including the hardware access layer, the control layer, and the main body device-side function layer.

7. The air conditioning system according to claim 6, wherein the remote device-side function layer of the remote device is in a same level of the hierarchical structure as the main body device-side function layer of the main body device.

8. The air conditioning system according to claim 1, wherein the control layer of the first software of the main body device, which receives the second instruction from the remote device-side function layer second software of the remote device, includes a communication control unit that controls communication between plural remote devices in different locations, the plural remote devices including the remote device.

* * * * *